United States Patent
Okada et al.

(10) Patent No.: US 12,434,763 B2
(45) Date of Patent: Oct. 7, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Kotaro Okada, Kashiba (JP); Kazuki Itazuri, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/508,491

(22) Filed: Nov. 14, 2023

(65) Prior Publication Data
US 2024/0158008 A1    May 16, 2024

(30) Foreign Application Priority Data

Nov. 16, 2022  (JP) ................. 2022-183602

(51) Int. Cl.
*B62D 6/00*  (2006.01)
*B60W 50/16*  (2020.01)

(52) U.S. Cl.
CPC ............. *B62D 6/008* (2013.01); *B60W 50/16* (2013.01)

(58) Field of Classification Search
CPC ...... B62D 5/0463; B62D 6/008; B60W 50/16
See application file for complete search history.

(56) References Cited

U.S. PATENT DOCUMENTS

| 9,598,098 | B2 * | 3/2017 | Sakurai ................... B62D 1/04 |
| 2007/0008083 | A1 * | 1/2007 | Berg ....................... B62D 1/181 340/425.5 |
| 2015/0210318 | A1 | 7/2015 | Takeda |
| 2021/0291893 | A1 * | 9/2021 | Nozawa .................... B62D 6/00 |
| 2022/0402483 | A1 * | 12/2022 | Harai ........................ G08G 1/00 |
| 2023/0026400 | A1 * | 1/2023 | Kuehner ................ B62D 6/008 |
| 2023/0227097 | A1 * | 7/2023 | Ojima .................. B62D 5/0484 701/43 |

FOREIGN PATENT DOCUMENTS

| JP | 2006-168629 A | 6/2006 |
| JP | 2022-068056 A | 5/2022 |
| JP | 2022-70111 A | 5/2022 |

OTHER PUBLICATIONS

Oct. 29, 2024 Office Action issued in European Patent Application No. 23 209 423.5.
Apr. 25, 2024 Extended Search Report issued in European Patent Application No. 23209423.5.

* cited by examiner

Primary Examiner — Long T Tran
(74) Attorney, Agent, or Firm — Oliff PLC

(57) ABSTRACT

A steering control device is configured to control a steering device. The steering device includes a steering wheel, a steering shaft coupled to the steering wheel, a turning wheel of a vehicle, and a motor configured to rotate the steering shaft. The turning wheel is configured to turn along with rotation of the steering shaft. The steering control device includes a processor. The processor is configured to execute an alarm information acquisition process of acquiring information indicating that an alarm needs to be issued to a driver of the vehicle, and a vibration process of vibrating the steering wheel in a predetermined region by operating the motor, in a situation where the alarm needs to be issued. The predetermined region is a region where a turning angle of the turning wheel does not change even when the steering wheel rotates.

4 Claims, 7 Drawing Sheets

START OF VIBRATION

END OF VIBRATION

STEERING CONTROL DEVICE

CROSS-REFERENCE TO RELATED APPLICATION

This application claims priority to Japanese Patent Application No. 2022-183602 filed on Nov. 16, 2022, incorporated herein by reference in its entirety.

BACKGROUND

1. Technical Field

The present disclosure relates to a steering control device.

2. Description of Related Art

For example, Japanese Unexamined Patent Application Publication No. 2022-68056 describes a control device that corrects a target steering angle depending on a steering direction. In this device, when a planned steering direction is a right steering direction, the target steering angle is corrected by a play amount that is a value corresponding to the right steering direction. The play amount is the maximum of an amount in which a turning angle of a turning wheel does not change even when a steering angle changes.

Further, there is well known a technology in which a warning about the departure of a vehicle from a lane is given to a driver by vibrating a steering wheel, in the case where the vehicle is about to depart from the lane.

SUMMARY

In the case of a vehicle in which the steering wheel and turning wheels are mechanically coupled, there is fear that the vibration of the steering wheel influences the behavior of the vehicle.

A steering control device according to an aspect of the present disclosure is configured to control a steering device. The steering device includes a steering wheel, a steering shaft coupled to the steering wheel, a turning wheel of a vehicle, and a motor configured to rotate the steering shaft. The turning wheel is configured to turn along with rotation of the steering shaft. The steering control device includes a processor. The processor is configured to execute an alarm information acquisition process and a vibration process. The alarm information acquisition process is a process of acquiring information indicating that an alarm needs to be issued to a driver of the vehicle. The vibration process is a process of vibrating the steering wheel in a predetermined region by operating the motor, in a situation where the alarm needs to be issued. The predetermined region is a region where a turning angle of the turning wheel does not change even when the steering wheel rotates.

In the above configuration, the steering wheel is vibrated in the predetermined region where the turning angle does not change even when the steering wheel rotates. Thereby, it is possible to sufficiently restrain the vibration process from influencing the behavior of the vehicle.

In the steering control device according to an aspect of the present disclosure, the vibration process may include a process of displacing the steering wheel in an opposite direction of a steering direction of the steering device, at start of the vibration process.

A steering-directional end portion of the two end portions of the above predetermined region tends to be the current rotation angle of the steering wheel. This means that the turning angle tends not to change even when the steering wheel is rotated to the opposite side of the steering direction. Therefore, in the above configuration, the steering wheel is displaced to the opposite side of the steering direction at the start of the vibration process. Thereby, it is possible to restrain the turning angle from unintentionally fluctuating due to the vibration process.

In the steering control device according to an aspect of the present disclosure, the vibration process may include a process of ending the vibration process by a process of displacing the steering wheel in a steering direction of the steering device.

In the above configuration, the vibration process is ended by displacing the steering wheel in the steering direction. Thereby, it is possible to quickly change the turning angle by further displacing the steering wheel in the steering direction.

In the steering control device according to an aspect of the present disclosure, the alarm information acquisition process may include a process of acquiring information indicating that the vehicle is in a situation where steering for avoiding danger needs to be performed, as the information indicating that the alarm needs to be issued.

In the above configuration, it is possible to inform the driver about the situation where the steering for avoiding the danger needs to be performed, by the vibration of the steering wheel.

In the steering control device according to an aspect of the present disclosure, the processor may be configured to execute a target rudder angle variable acquisition process, a target rudder angle correction process, and a rudder angle control process. The target rudder angle variable acquisition process may be a process of acquiring the value of a target rudder angle variable. The target rudder angle variable may be a variable that indicates a turning angle of the turning wheel and that is set to a value for avoiding the danger in the situation where the steering for avoiding the danger needs to be performed. The target rudder angle correction process may be a process of correcting the value of the target rudder angle variable by a play compensation amount corresponding to a steering direction of the steering device. The rudder angle control process may be a process of operating the motor by a control in which a steering angle depending on a rotation angle of the steering shaft is adopted as a control amount and the value of the target rudder angle variable is adopted as a target value of the control amount. The processor may be configured to start the vibration process after the value of the target rudder angle variable is corrected by the play compensation amount corresponding to the steering direction for avoiding the danger.

When the value of the target rudder angle variable is corrected by the play compensation amount corresponding to the steering direction for avoiding the danger, the steering-directional end portion of the two end portions of the predetermined region gets close to the current steering angle. Therefore, after the value of the target rudder angle variable is corrected by the play compensation amount corresponding to the steering direction for avoiding the danger, it is easy to know the position of the current steering angle in the predetermined region. Therefore, it is easy to vibrate the steering wheel in the predetermined region.

In the above configuration, it is easy to know the maximum of the amplitude for the vibration in the predetermined region.

In the steering control device according to an aspect of the present disclosure, the processor may be configured to execute a play displacement calculation process, a base amount setting process, and a gradual change process. The play displacement calculation process may be a process of calculating a play displacement each time the steering angle changes. The steering angle may be a rotation angle of the steering wheel. The play displacement may be an amount that identifies a position in a region where the turning angle does not change even when the steering angle changes. The turning angle may be a moving angle of the turning wheel. The base amount setting process may be a process of setting a play base amount corresponding to a right steering direction and a play base amount corresponding to a left steering direction, to amounts that allow the steering angle to be values of end portions of the region, depending on the play displacement at a timing of setting of the play base amount. The gradual change process may be a process of gradually changing the magnitude of the play compensation amount to the magnitude of the play base amount after the value of the target rudder angle variable changes in the right steering direction or the left steering direction. The processor may be configured to start the vibration process after the play compensation amount becomes the play base amount.

When the value of the target rudder angle variable after the correction depending on the play base amount coincides with the steering angle, the steering-directional end portion of the two end portions of the predetermined region coincides with the steering angle. Therefore, it is possible to clearly know the predetermined region.

In the above configuration, it is easy to know the maximum of the amplitude for the vibration in the predetermined region.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
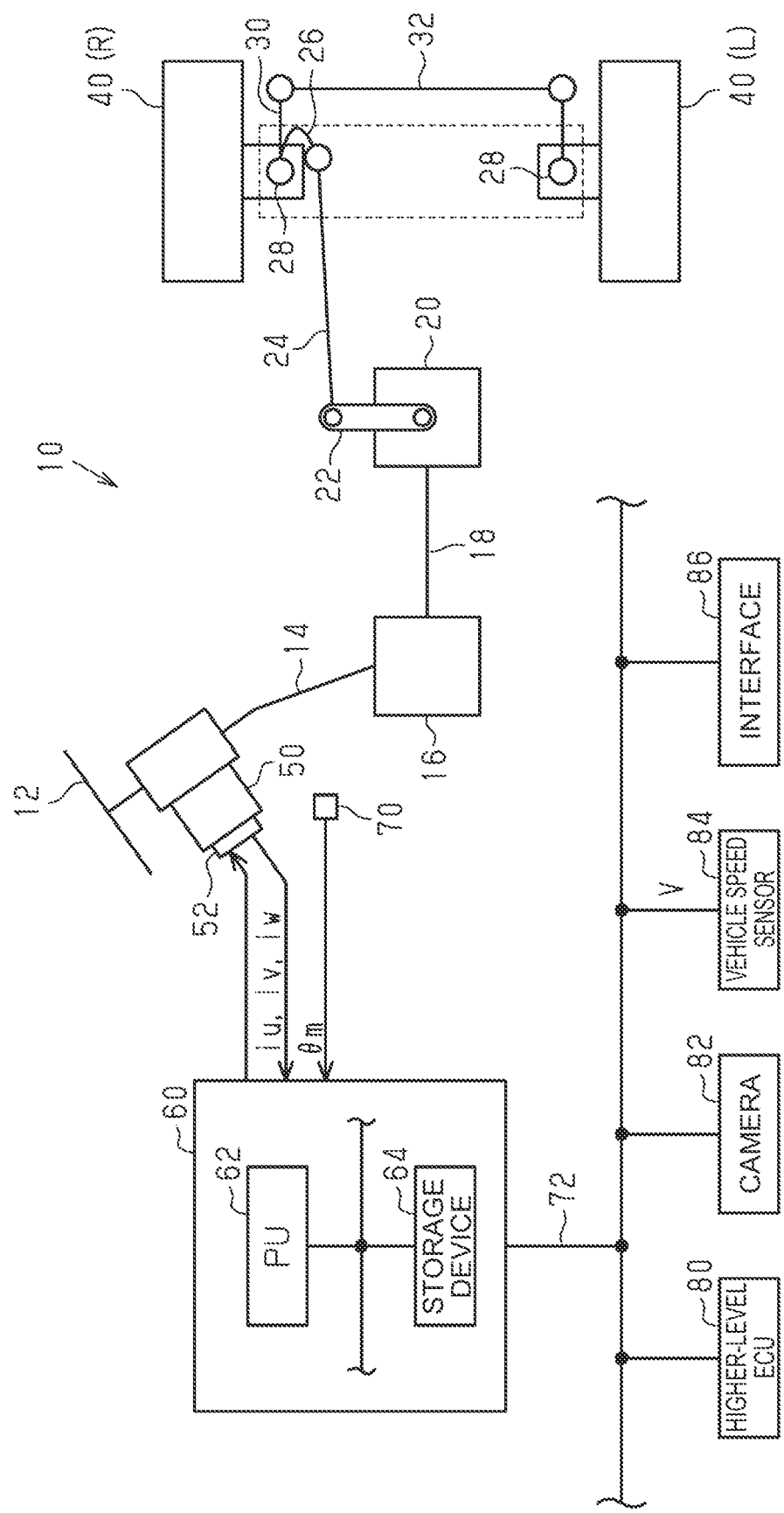
FIG. 1 is a block diagram showing the configuration of a steering system according to an embodiment.

An embodiment will be described below with reference to the drawings.
Base Configuration A steering device 10 shown in FIG. 1 includes a steering wheel 12. A steering shaft 14 is coupled to the steering wheel 12. An end portion of the steering shaft 14 on the opposite side of the steering wheel 12 is coupled to an input shaft of the bevel gear unit 16. An output shaft of the bevel gear unit 16 is coupled to an input shaft of a hydraulic power steering device 20 through a dynamic power transmission shaft 18. A sector shaft of the hydraulic power steering device 20 is coupled to one end portion of a pitman arm 22. The other end portion of the pitman arm 22 is coupled to one end portion of a drag link 24. The other end portion of the drag link 24 is coupled to one end portion of a knuckle arm 26. The other end portion of the knuckle arm 26 is coupled to a kingpin shaft 28 of a right turning wheel 40(R). The kingpin shaft 28 of the right turning wheel 40(R) and a kingpin shaft 28 of a left turning wheel 40(L) are coupled by a tie rod arm 30 and a tie rod 32.

The rotation power of the motor 50 is transmitted to the steering shaft 14. As an example, the motor 50 is a synchronous electric motor. The output voltage of an inverter 52 is applied to a terminal of the motor 50.

A steering control device 60 controls the steering device 10 as a control object. For the control of the control object, the steering control device 60 refers to a rotation angle θm of the motor 50 that is detected by a rotation angle sensor 70. Further, the steering control device 60 refers to electric currents iu, iv, iw that flow through respective terminals of the motor 50. For example, the electric currents iu, iv, iw may be detected as voltage drop amounts by shunt resistances provided on respective legs of the inverter 52. The steering control device 60 refers to a vehicle speed V detected by a vehicle speed sensor 84, through a network 72.

The steering control device 60 can communicate with a higher-level ECU 80 through the network 72. The higher-level ECU 80 executes a process of generating a command for intervening in the steering of a vehicle, independently of the instruction of the steering by the operation of the steering wheel 12. In other words, the higher-level ECU 80 executes an automatic steering process. The automatic steering process in the embodiment is a process of performing the steering intervention for solving a situation where the vehicle is about to depart from a lane due to the operation of the steering wheel 12 by a driver. For executing the automatic steering process, the higher-level ECU 80 acquires image data about the forward view of the vehicle that is photographed by a camera 82. Further, the higher-level ECU 80 knows an intention that is input by the driver through an interface 86 and that indicates whether the automatic steering process is executed, and the like.

The steering control device 60 includes a PU 62 and a storage device 64. The PU 62 is a software processing device such as a CPU, a GPU, and a TPU. The storage device 64 may be an electrically non-rewritable non-volatile memory. Further, the storage device 64 may be an electrically rewritable non-volatile memory or a storage medium such as a disk medium. The PU 62 executes a program stored in the storage device 64, so that the steering control device 60 executes the process of controlling the control object.
Characteristic of Steering Device 10

The above-described steering device 10 has a complex link structure, and therefore a so-called play in which the turning wheel 40 does not rotate even when the steering shaft 14 rotates is large.

Figure 2:
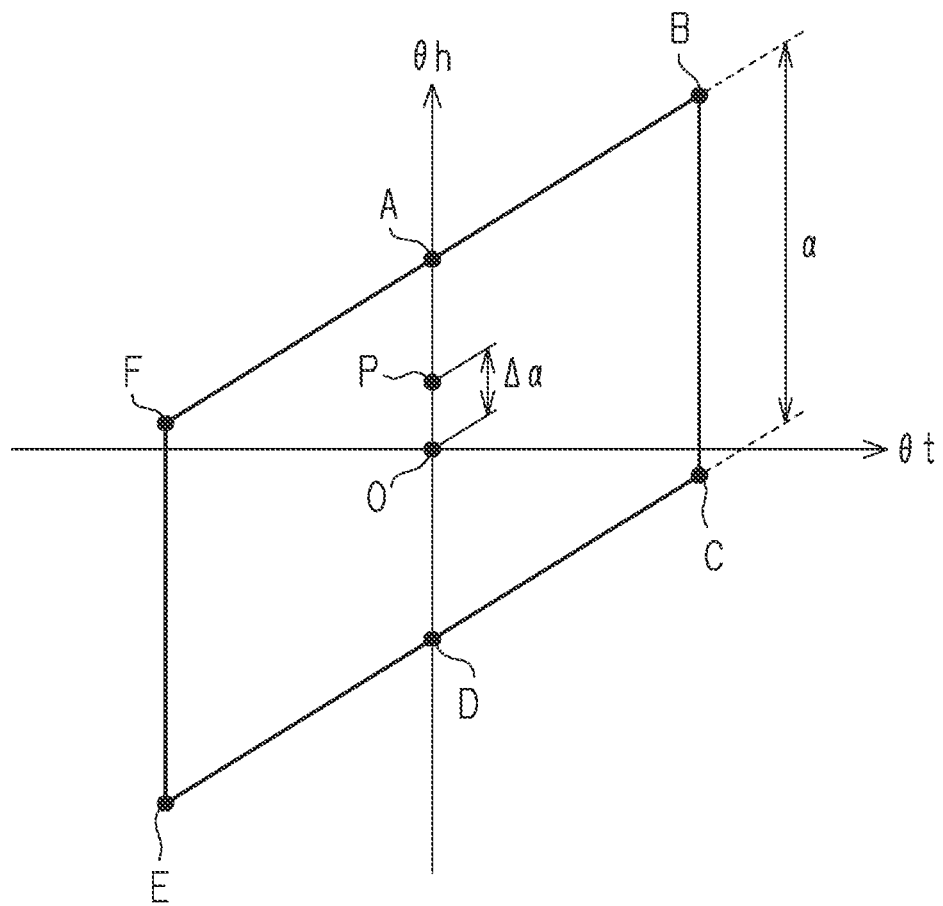
FIG. 2 is a diagram showing the relation between a steering angle and a turning angle according to the embodiment.

FIG. 2 shows the relation between a steering angle θh and a turning angle θt. The steering angle θh is the rotation angle of the steering shaft 14. On the other hand, the turning angle θt is the moving angle of a tire for the turning wheel 40.

Further, a neutral position O described in FIG. 2 is a point where both of the steering angle θh and the turning angle θt are zero. This means that both of the steering angle θh and the turning angle θt indicate a straight-movement direction. Hereinafter, the rotation angle in the right turn direction is a positive angle, and the rotation angle in the left turn direction is a negative angle.

As shown in FIG. 2, even when the steering angle θh is changed from the neutral position O in the right turn direction, the turning angle θt does not change until the steering angle θh reaches a point A. Then, when the steering angle θh becomes a further large value than the point A, the turning angle θt increases.

Further, even when the steering angle θh is decreased at a point B, the turning angle θt does not change. In other words, even when the steering direction is switched to the left side at the point B, the turning angle θt does not change. The steering direction is a direction that is indicated by the rotation speed of the steering shaft 14. Then, when the steering angle θh becomes a further small value beyond a point C, the turning angle θt decreases. In other hands, the steering angle θh is a negative value, and when the absolute value of the steering angle θh is further increased beyond the point C, the turning angle θt decreases.

Then, at a point D where the turning angle θt becomes zero, the steering angle θh becomes a negative value.

A point E is a value that is obtained by further displacing the steering angle θh in the left steering direction after the turning angle θt becomes zero. Even when the steering angle θh is increased at the point E, the turning angle θt does not change until the steering angle θh reaches a point F. When the steering angle θh becomes further large beyond the point F, the turning angle θt increases.

In this way, for example, in the case of the position of the point B, the turning angle θt does not change even when the steering angle θh changes between the point B and the point C. Further, for example, in the case of the position of the point E, the turning angle θt does not change even when the steering angle θh changes between the point E and the point F. In this way, due to the play of the steering device 10, there is a region where the turning angle θt does not change even when the steering angle θh changes. This region is not a region that includes fixed values of the steering angle θh but a region that can be changed by a history of the change in the steering angle θh.

The displacement of the steering angle θh from the point B to the point C occurs at the time of the switching-back from the right turn. Further, the displacement of the steering angle θh from the point E to the point F occurs at the time of the switching-back from the left turn. The length of the region where the turning angle θt does not change even when the steering angle θh changes at the time of the switching-back is described as "α" in FIG. 2. Further, "α" is previously stored in the storage device 64. For example, "α" may be a fixed value. Further, for example, "α" may be a value that is often updated. For example, the update process for "α" can be executed as follows.

1. The PU 62 rotates the steering shaft 14 by controlling the rotation angle of the motor 50 at the time of the stop of the vehicle.
2. The PU 62 identifies an end portion of the above region by the rotation angle of the motor 50 immediately before the electric current flowing through the motor 50 by the rotation of the motor 50 exceeds a threshold.

The PU 62 estimates "α" by performing the control of the rotation angle of the motor 50 described in "1" and "2" described above for both of right rotation and left rotation.

The PU 62 updates the "α" stored in the storage device 64, by the estimated "α". For example, the PU 62 may store the estimated "α" in the storage device 64. Further, for example, in the storage device 64, the PU 62 may newly store a value resulting from weighted average processing between the estimated "α" and the "α" stored in the storage device 64.

Setting of Play Base Amount

The above region causes the decrease in the responsiveness of the change in the turning angle θt with respect to the change in the steering angle θh. Therefore, in the embodiment, the decrease in the responsiveness is restrained by a play compensation amount. First, the setting of a play base amount that is a base amount for calculating the play compensation amount will be described.

Figure 3:
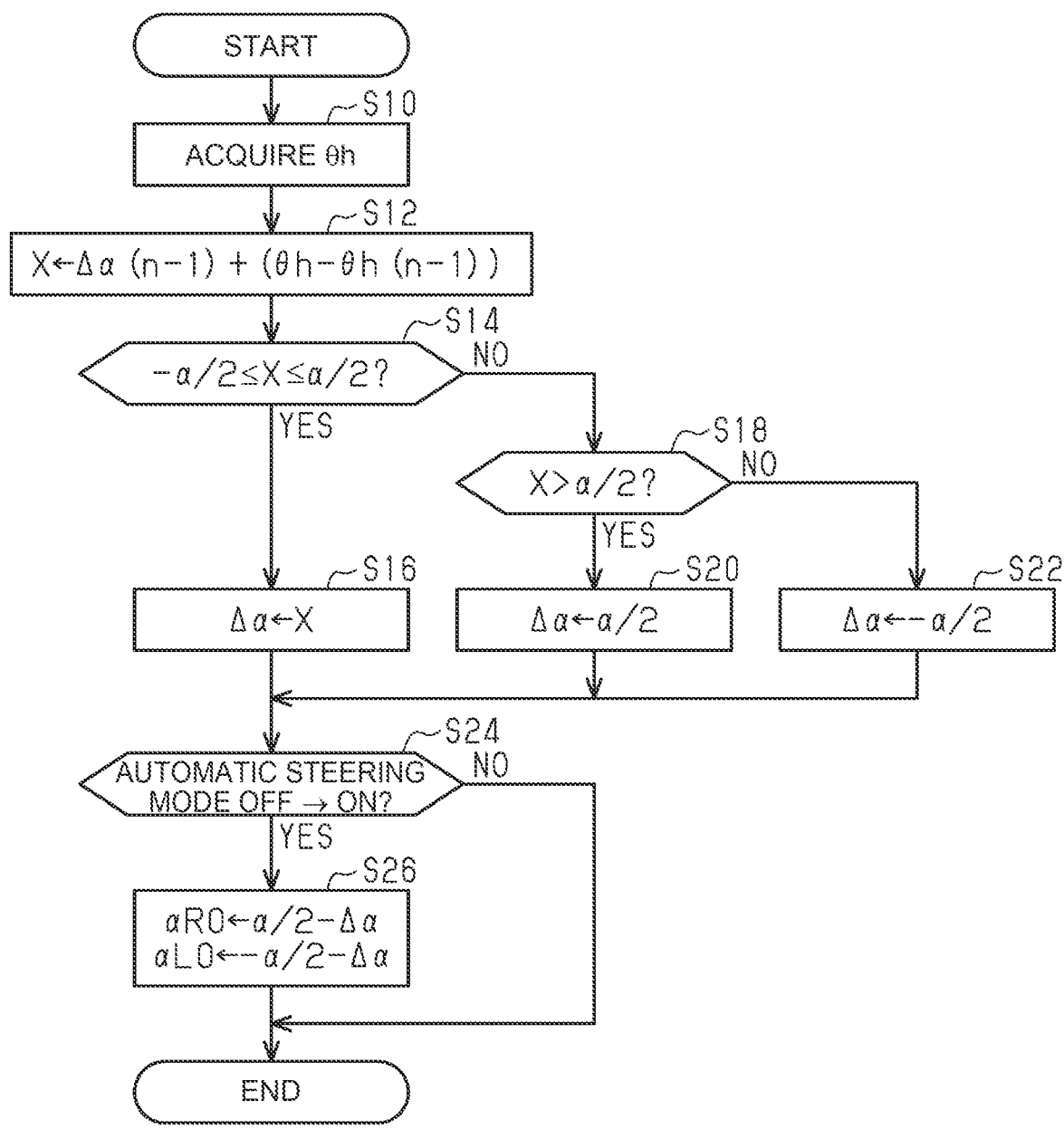
FIG. 3 is a flowchart showing a procedure of a process that is executed by a control device according to the embodiment.

FIG. 3 shows a procedure of a process relevant to the setting of the play base amount. The process shown in FIG. 3 is realized when the PU 62 repeatedly executes a program stored in the storage device 64 with a predetermined period, for example. Hereinafter, step numbers for processes are expressed as numerals in which "S" is put to the head.

In a sequence of processes shown in FIG. 3, the PU 62 acquires the steering angle θh (S10). The steering angle θh is calculated by integration processing of the rotation angle θm, by the PU 62. Next, the PU 62 calculates a variable X for calculating a play displacement, by the following expression (S12).

$$X \leftarrow \Delta\alpha(n-1)+(\theta h-\theta h(n-1))$$

In the above expression, "n−1" means a value at the last execution timing before the execution timing of the sequence of processes shown in FIG. 3. That is, "Δα(n−1)" means a play displacement Δα at the last execution timing of the sequence of processes shown in FIG. 3. Further, "θh(n−1)" means a value acquired in the process of S10 at the last execution timing of the sequence of processes shown in FIG. 3.

FIG. 2 exemplifies the play displacement Δα. FIG. 2 shows a state where the steering angle θh has reached the position of the point P because the steering angle θh has been changed from the neutral position O to the right by the play displacement Δα. Back to FIG. 3, the PU 62 determines whether the value of the variable X is equal to or larger than "−α/2" and is equal to or smaller than "α/2" (S14). In the case where the PU 62 makes the positive determination in the process of S14, the PU 62 substitutes the value of the variable X into the play displacement Δα (S16).

On the other hand, in the case where the PU 62 makes the negative determination in the process of S14, the PU 62 determines whether the value of the variable X is larger than "α/2" (S18). In the case where the PU 62 determines that the value of the variable X is larger than "α/2" (S18: YES), the PU 62 substitutes "α/2" into the play displacement Δα (S20). This process corresponds to a situation in which the steering angle θh has been greatly changed to the right beyond the point A in FIG. 2, for example. In that case, the play displacement Δα is positioned at the end portion in the right steering direction of the region where the turning angle θt does not change even when the steering angle θh changes. When the length of the region is "α" and the center of the region is defined as "0", the play displacement Δα at the end portion in the right steering direction of the above region is "α/2".

On the other hand, in the case where the PU 62 makes the negative determination in the process of S18, the PU 62 substitutes "−α/2" into the play displacement Δα (S22). In the case where the PU 62 completes the processes of S16, S20, and S22, the PU 62 determines whether the switching to an automatic steering mode has been performed (S24). The automatic steering mode is a mode in which the above automatic steering process is executed. In the automatic steering mode, the higher-level ECU 80 outputs a target angle θt* to the steering control device 60. The target angle θt* is a variable that indicates the target value of the turning angle of the turning wheel 40. The change amount of the target angle θt* is quantified so as to be equal to the change amount of the steering angle θh between the point F and the point B or between the point C and the point E shown in FIG. 2. The processes of S10 to S22 are an example of the play displacement calculation process.

In the case where the PU 62 determines that the switching has been performed (S24: YES), the PU 62 sets a right play base amount αR0 and a left play base amount αL0 (S26). That is, the PU 62 substitutes "α/2−Δα" into the right play base amount αR0. Further, the PU 62 substitutes "−α/2−Δα" into the left play base amount αL0. The processes of S24 and S26 are an example of the base amount setting process.

For example, in the case where the play displacement Δα is positioned at the point P shown in FIG. 2 at the time when the switching to the automatic steering mode has been performed, the turning angle does not change until the steering angle θh changes by "α/2−Δα", even when the target angle θt* is changed in the right steering direction. Therefore, for enhancing the responsiveness of the turning angle with respect to the change in the target angle θt*, it is desirable to correct the target angle θt* by "α/2−Δα", by an open-loop control, with the change in the target angle θt* in the right steering direction. Therefore, the PU 62 substitutes "α/2−Δα" into the right play base amount αR0. Further, in the case where the play displacement Δα is positioned at the point P, the turning angle does not change until the steering angle θh changes by "−α/2−Δα", even when the target angle θt* is changed in the left steering direction. Therefore, for enhancing the responsiveness of the turning angle with respect to the change in the target angle θt*, it is desirable to correct the target angle θt* by "−α/2−Δα", by the open-loop control, with the change in the target angle θt* in the left steering direction. Therefore, the PU 62 substitutes "−α/2−Δα" into the left play base amount αL0.

In the case where the PU 62 completes the process of S26 or makes the negative determination in the process of S24, the PU 62 ends the sequence of processes shown in FIG. 3 once.

Setting of Play Compensation Amount

Figure 4:
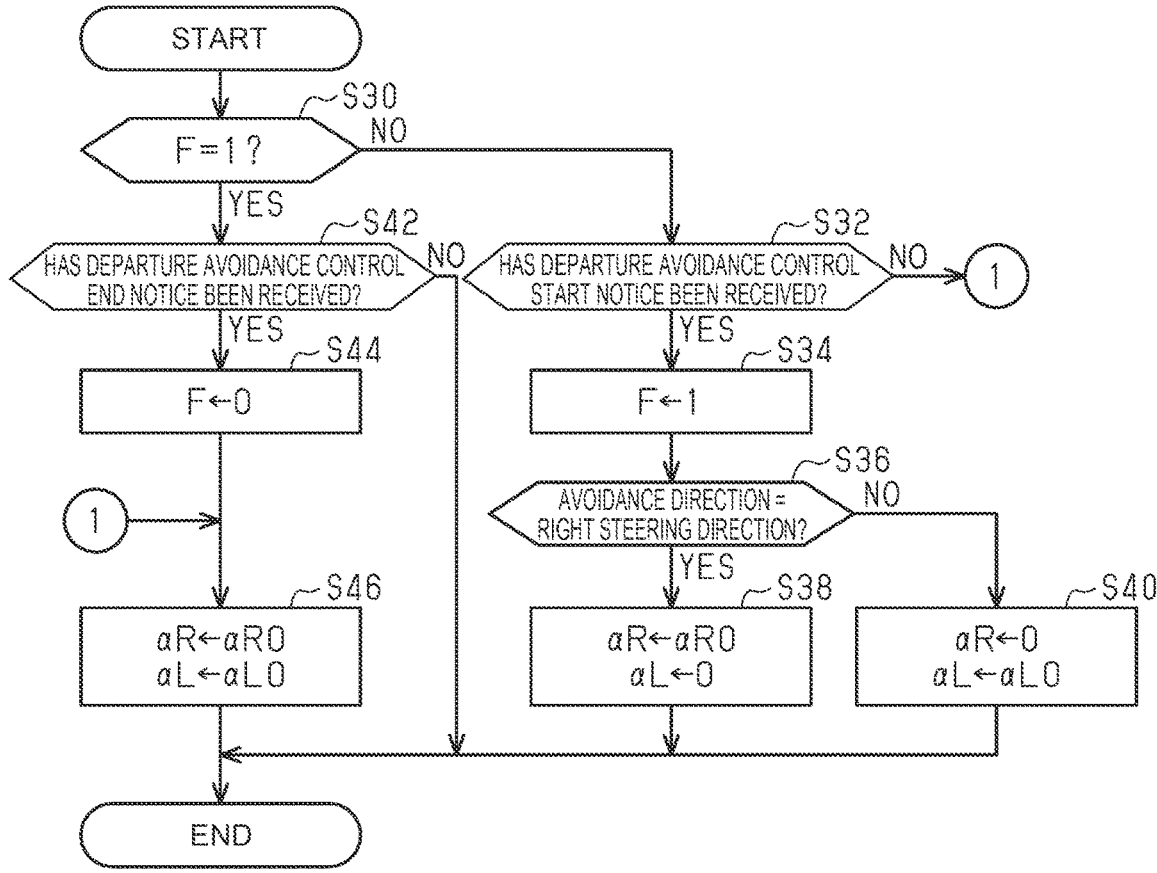
FIG. 4 is a flowchart showing a procedure of a process that is executed by the control device according to the embodiment.

FIG. 4 shows a procedure of a process relevant to the setting of the play compensation amount. The process shown in FIG. 4 is realized when the PU 62 repeatedly executes a program stored in the storage device 64 with a predetermined period in the automatic steering mode, for example.

In a sequence of processes shown in FIG. 4, first, the PU 62 determines whether a flag F is "1" (S30). In the case where the flag F is "1", a steering intervention process for restraining the vehicle from departing from the lane is being executed. In the case where the flag F is "0", the steering intervention process is not being executed.

In the case where the PU 62 determines that the flag F is "0" (S30: NO), the PU 62 determines whether a start notice for a departure avoidance control has been received from the higher-level ECU 80 (S32). The start notice is given when the control to restrain the departure from the lane is started by the steering intervention. On this occasion, the higher-level ECU 80 gives also the steering direction for the departure avoidance. In the case where the PU 62 determines that the start notice has been received (S32: YES), the PU 62 substitutes "1" into the flag F (S34). Then, the PU 62 determines whether the steering direction for the departure avoidance by the higher-level ECU 80 is the right steering direction (S36). The process of S32 is an example of the alarm information acquisition process.

In the case where the PU 62 determines that the steering direction is the right steering direction (S36: YES), the PU 62 transitions to S38. In the process of S38, the PU 62 substitutes the right play base amount αR0 into the right play compensation amount αR, and substitutes "0" into the left play compensation amount αL. On the other hand, in the case where the PU 62 determines that the steering direction is the left steering direction (S36: NO), the PU 62 transitions to S40. In the process of S40, the PU 62 substitutes "0" into the right play compensation amount αR, and substitutes the left play base amount αL0 into the left play compensation amount αL.

On the other hand, in the case where the PU 62 determines that the flag F is "1" (S30; YES), the PU 62 determines whether a departure avoidance control end notice has been received from the higher-level ECU 80 (S42). The departure avoidance control end notice is output from the higher-level ECU 80 when the steering intervention for the departure avoidance ends. The departure avoidance control end notice is not a notice indicating the end of the steering intervention itself. This will be described below based on FIG. 5.

Figure 5:
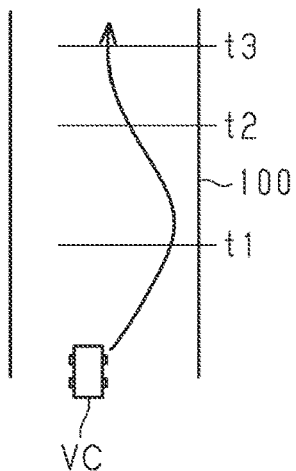
FIG. 5 is a diagram exemplifying a departure avoidance control according to the embodiment.

FIG. 5 shows a case where a vehicle VC excessively approaches the right side and is about to depart from the lane. In other words, FIG. 5 shows a case where the vehicle VC excessively approaches a white line 100 on the right side. In this case, at time t1, the departure avoidance control start notice is output from the higher-level ECU 80. At time t2, the departure avoidance control end notice is output from the higher-level ECU 80. The time period from time t1 to time t2 is a time period during which the steering direction is the left side or the turning angle is a value on the left turn side and the steering angle is constant. Here, very small fluctuations of the turning angle by the feedback control are ignored. In the case where the turning angle at time t2 is maintained, the vehicle VC gets close to the left side of the lane. Hence, for causing the vehicle VC to travel along the lane, the higher-level ECU 80 further executes the steering intervention from time t2 to time t3. In the time period from time t2 to time t3, a process after the end of the departure avoidance control is performed. That is, the time period from time t1 to time t2 is a time period during which the higher-level ECU 80 executes a control to cause the vehicle VC to approach the left side. On the other hand, the time period from time t2 to time t3 is a time period during which the higher-level ECU 80 executes a control to cause the vehicle VC to travel straight along the lane after the control to cause the vehicle VC to approach the left side.

Back to FIG. 4, in the case where PU 62 determines that the departure avoidance control end notice has been received (S42: YES), the PU 62 substitutes "0" into the flag F (S44). In the case where the PU 62 completes the process of S44 or makes the negative determination in the process of S32, the PU 62 transitions to the process of S46. In the process of S46, the PU 62 substitutes the right play base amount αR0 into the right play compensation amount αR, and substitutes the left play base amount αL0 into the left play compensation amount αL (S46).

In the case where the PU 62 completes the process of S38, S40, or S46, the PU 62 ends the sequence of processes shown in FIG. 4 once.

Control of Turning Angle in Automatic Steering Mode

Figure 6:
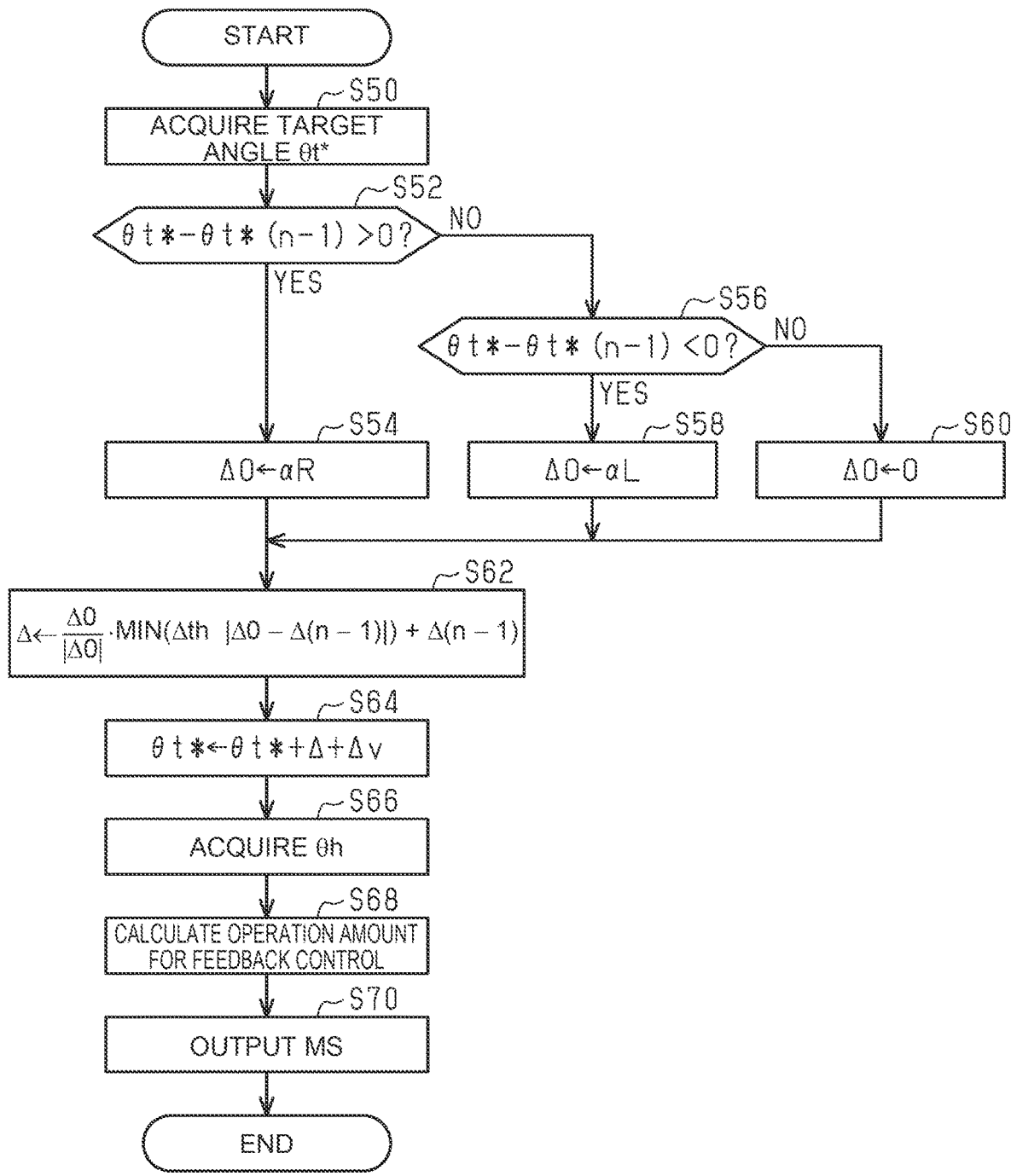
FIG. 6 is a flowchart showing a procedure of a process that is executed by the control device according to the embodiment.

FIG. 6 shows a procedure of a process relevant to the control of the turning angle. The process shown in FIG. 6 is realized when the PU 62 repeatedly executes a program stored in the storage device 64 with a predetermined period in the automatic steering mode, for example.

In a sequence of processes shown in FIG. 6, first, the PU 62 acquires the target angle θt* that is output by the higher-level ECU 80 (S50). The target angle θt* is a target value of the turning angle of the turning wheel 40. Next, the PU 62 determines whether the change in the target angle θt* is positive (S52). In other words, the PU 62 determines whether the change direction of the target angle θt* is the right steering direction. In the case where the change direction of the target angle θt* is the right steering direction, the instruction from the higher-level ECU 80 through the target angle θt* is the right steering. In FIG. 6, the target angle θt* acquired by the process of S50 at the previous execution timing of the sequence of processes in FIG. 6 is described as "θt*(n−1)". The process of S50 is an example of the target rudder angle variable acquisition process. The target angle θt* is an example of the target angle θt*.

In the case where the PU 62 determines that the change in the target angle θt* is positive (S52: YES), the PU 62 substitutes the right play compensation amount αR into a play compensation amount Δ0 (S54). On the other hand, in the case where the PU 62 makes the negative determination in the process of S52, the PU 62 determines whether the change in the target angle θt* is negative (S56). In other words, the PU 62 determines whether the change direction of the target angle θt* is the left steering direction. In the case where the PU 62 determines that the change in the target angle θt* is negative (S56: YES), the PU 62 substitutes the left play compensation amount αL into the play compensation amount Δ0 (S58).

In the case where the PU 62 makes the negative determination in the process of S56, the PU 62 substitutes "0" into the play compensation amount Δ0 (S60).

In the case where the PU 62 completes the process of S54, S58, or S60, the PU 62 performs a guard process of restricting the magnitude of the change speed of the play compensation amount Δ0 to a small side (S62). The value after the guard process is a play compensation amount Δ. When the play compensation amount Δ at the last execution timing of the sequence of processes shown in FIG. 6 is "Δ(n−1)", the output of the process of S62 is shown as follows.

(Δ0/|Δ0|)·MIN(Δth|Δ0−Δ(n−1)|)+Δ(n−1)

An upper limit Δth specifies the maximum of the magnitude of the change amount of the play compensation amount Δ in the execution period of the processes shown in FIG. 6. The process of S62 is an example of the gradual change process.

Next, the PU 62 substitutes a value resulting from adding the play compensation amount Δ and a vibration component Δv to the target angle θt*, into the target angle θt* (S64). The vibration component Δv will be described later. Next, the PU 62 acquires the steering angle θh (S66). Then, the PU 62 calculates an operation amount for a feedback control in which the steering angle θh is adopted as a control amount and the target angle θt* is adopted as the target variable of the control amount (S68). The operation amount may be the torque of the motor 50. Next, for controlling the motor 50 depending on the operation amount, the PU 62 outputs an operation signal MS to the inverter 52 (S70). Thereby, for example, in the case where the operation amount is the torque of the motor 50, the output voltage of the inverter 52 is operated such that the torque of the motor 50 becomes the operation amount. This process may be executed while the electric currents iu, iv, iw are adopted as inputs, for example. The processes of S68 and S70 when the vibration component Δv is not "0" are an example of the vibration process. The process of S64 is an example of the target rudder angle correction process. The processes of S68 to S70 are an example of the rudder angle control process.

In the case where the PU 62 completes the process of S70, the PU 62 ends the sequence of processes shown in FIG. 6 once. In a period during which the processes of S50 to S60 are executed, the processes of S62 to S70 may be executed multiple times. In that case, the play compensation amount Δ at the last execution timing of the process of S62 is "Δ(n−1)". Thereby, it is possible to more surely cause the play compensation amount Δ to converge on the play compensation amount Δ0 before the stop of the change in the target angle θt*.

Alarm Issuing Process for Lane Departure Avoidance

Figure 7:
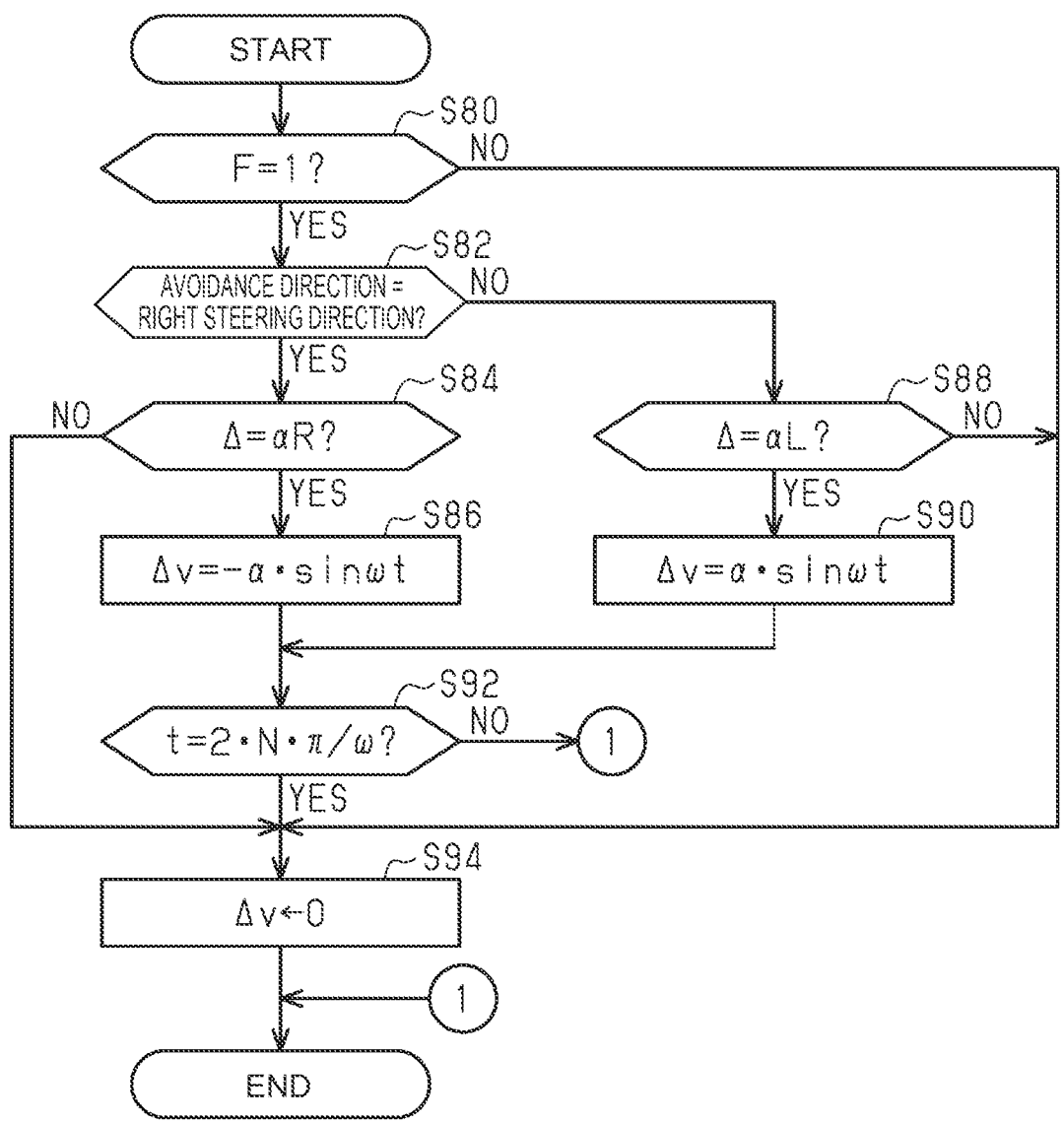
FIG. 7 is a flowchart showing a procedure of a process that is executed by the control device according to the embodiment.

FIG. 7 shows a procedure of an alarm issuing process for lane departure avoidance. The process shown in FIG. 7 is realized when the PU 62 repeatedly executes a program stored in the storage device 64 with a predetermined period in the automatic steering mode, for example.

In a sequence of processes shown in FIG. 7, first, the PU 62 determines whether the flag F is "1" (S80). In the case where the PU 62 determines that the flag F is "1" (S80: YES), the PU 62 determines whether the steering direction for departure avoidance by the higher-level ECU 80 is the right steering direction (S82). In the case where the PU 62 determines that the steering direction is the right steering direction (S82: YES), the PU 62 determines whether the play compensation amount Δ coincides with the right play compensation amount αR (S84). This process is a process for determining whether the process of S62, that is, the process of gradually changing the play compensation amount Δ to the right play compensation amount αR is completed.

In the case where the PU 62 determines that the play compensation amount Δ coincides with the right play compensation amount αR (S84: YES), the PU 62 substitutes "−α·sin(ωt)" into the vibration component Δv (S86). A time t at the time point when the positive determination is made in the process of S84 for the first time is "0". In the process of S86, with the lapse of time, for the vibration component Δv, which is a negative value, the absolute value increases once, and thereafter gradually decreases to zero. Thereafter, the vibration component Δv becomes a positive value. In other words, the vibration component Δv becomes a value for the left steering direction, and thereafter becomes a value for the right steering direction.

On the other hand, in the case where the PU 62 determines that the steering direction for departure avoidance by the higher-level ECU 80 is the left steering direction (S82: NO), the PU 62 determines whether the play compensation amount Δ coincides with the left play compensation amount αL (S88). This process is a process for determining whether the process of S62, that is, the process of gradually changing the play compensation amount Δ to the left play compensation amount αL is completed.

In the case where the PU 62 determines that the play compensation amount Δ coincides with the left play compensation amount αL (S88: YES), the PU 62 substitutes "α·sin(ωt)" into the vibration component Δv (S90). The time t at the time point when the positive determination is made in the process of S88 for the first time is "0". In the process of S90, with the lapse of time, for the vibration component Δv, which is a positive value, the absolute value increases once, and thereafter gradually decreases to zero. Thereafter, the vibration component Δv becomes a negative value. In other words, the vibration component Δv becomes a value for the right steering direction, and thereafter becomes a value for the left steering direction.

In the case where the PU 62 completes the process of S86 or S90, the PU 62 determines whether the time t is "$2 \cdot N \cdot \pi / \omega$" (S92). This process is a process for determining whether the application of the vibration component Δv is stopped. Here, "N" is the number of times of vibration. That is, in the case where sine wave vibration is applied to the steering wheel 12 for "N" times of one period, the application of the vibration component Δv is stopped.

In the case where the PU 62 determines that the time t is "$2 \cdot N \cdot \pi / \omega$" (S92: YES) or makes the negative determination in the process of S80, S84, or S88, the PU 62 substitutes "0" into the vibration component Δv (S94). In the case where the PU 62 completes the process of S94 or makes the negative determination in the process of S92, the PU 62 ends the sequence of processes shown in FIG. 7 once. In the case where the PU 62 completes the process of S94, the PU 62 does not execute the sequence of processes shown in FIG. 7 until the flag F becomes "0". Instead of this, the process of S92 may be changed to a process of determining whether the time t is equal to or larger than "$2 \cdot N \cdot \pi / \omega$", and this process may be executed between the process of S80 and the process of S82.

Operation and Effect of Embodiment

When the PU 62 receives a start notice for the departure avoidance control from the higher-level ECU 80, the PU 62 vibrates the steering wheel 12.

Figure 8A:
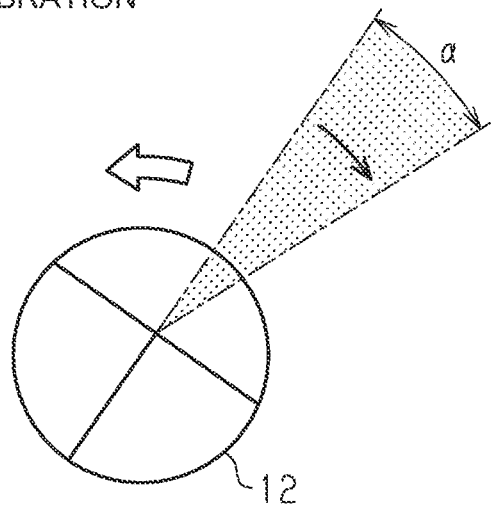
FIG. 8A is a diagram exemplifying a vibration process for a steering wheel according to the embodiment.

FIG. 8A shows a state at the start of the vibration. FIG. 8A shows a case where the steering direction for the departure avoidance control is the left direction. When the play compensation amount Δ becomes the left play compensation amount αL, the PU 62 applies the vibration component Δv. On that occasion, as shown in FIG. 8A, the PU 62 starts the vibration by displacing the steering wheel 12 in the right steering direction. At the time when the play compensation amount Δ becomes the left play compensation amount αL and the steering angle θh becomes equal to the target angle θt*, the turning angle does not change even when the steering angle θh is displaced by "α" in the right steering direction. Thereby, by starting the application of the vibration by displacing the steering wheel in the right steering direction, the PU 62 can apply the vibration without influencing the turning angle. The process in FIG. 8A is an example of the vibration process including the process of displacing the steering wheel in the opposite direction of the steering direction of the steering device, at the start of the vibration process.

Figure 8B:
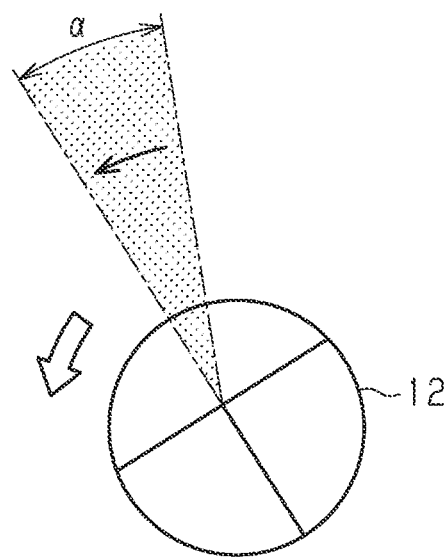
FIG. 8B is a diagram exemplifying the vibration process for the steering wheel according to the embodiment.

The PU 62 applies the vibration for N periods, and thereafter stops the application of the vibration. As shown in the process of S86 or S90, the vibration component Δv immediately before the stop is zero. Accordingly, in the case where the steering direction for the departure avoidance control is the left direction, the application of the vibration component Δv is ended immediately before the vibration direction switches from the left steering direction to the right steering direction, as shown in FIG. 8B. Accordingly, at that time, the correction amount for the target angle θt* is equal to the play compensation amount Δ. Accordingly, it is possible to restrain the decrease in the responsiveness of the change in the turning angle with respect to the change in the steering angle θh due to the end of the application of the vibration component Δv. A dotted region shown in FIG. 8A and FIG. 8B is an example of the predetermined region. The process in FIG. 8B is an example of the vibration process including the process of ending the vibration process by the process of displacing the steering wheel in the steering direction of the steering device.

With the embodiment described above, the operation and effect described below are further obtained.

(1-1) When the right play compensation amount αR is the right play base amount αR0 and the left play compensation amount αL is the left play base amount αL0, it is possible to accurately control the turning angle depending on the target angle θt*, by controlling the steering angle θh to the target angle θt*. However, for example, there is a possibility that the target angle θt* is changed in the right steering direction by the fine adjustment of the control, in the time period from time t1 to t2 exemplified in FIG. 5. In that case, when the play compensation amount Δ is the right play base amount αR0, there is concern of the lack of the stability of the control to restrain the departure from the lane. Hence, the PU 62 sets the right play compensation amount αR in that case to zero. Thereby, it is possible to secure the stability of the control to restrain the departure from the lane.

Other Embodiments

The embodiment can be carried out while being modified as follows. The embodiment and the following modifications can be carried out while being combined with each other, as long as there is no technical inconsistency.

Vibration Process

In the process of S86, sine waves are adopted as the vibration component Δv that is applied to the steering wheel 12, but the applicable embodiment is not limited to this. For example, sawtooth waves may be adopted.

In the process of S86, the magnitude of the amplitude of the vibration component Δv that is applied to the steering wheel 12 is "α", but the applicable embodiment is not limited to this. A value that is larger than "0" and is smaller than "α" may be adopted.

In the process of S90, sine waves are adopted as the vibration component Δv that is applied to the steering wheel 12, but the applicable embodiment is not limited to this. For example, sawtooth waves may be adopted. In the process of S90, the magnitude of the amplitude of the vibration component Δv that is applied to the steering wheel 12 is "α", but the applicable embodiment is not limited to this. A value that is larger than "0" and is smaller than "α" may be adopted.

Process of Acquiring Information Indicating that Vehicle is in Situation where Steering for Avoiding Danger Needs to be Performed The process of acquiring the information indicating that the vehicle is in the situation where the steering for avoiding the danger needs to be performed is not limited to the process of acquiring the information indicating the departure from the lane. For example, information indicating that there is an obstacle that obstructs the traveling of the vehicle may be adopted. Further, information indicating that there is a cliff near the traveling vehicle may be adopted.

Alarm Information Acquisition Process

The alarm information acquisition process is not limited to a process of acquiring the information indicating that the vehicle is in the situation where the steering for avoiding the danger needs to be performed. For example, it is allowable to adopt a process of acquiring information indicating that the vehicle is in a situation where the driver is looking aside while driving or is falling asleep while driving, in the case where it is determined that the driver is looking aside while driving or is falling asleep while driving based on the output of a camera installed within the vehicle.

Target Rudder Angle Variable

The target rudder angle variable is not limited to the value resulting from converting the turning angle of the turning wheel 40 into the rotation angle of the steering shaft 14. For example, the turning angle itself may be adopted. In that case, in the process of S68, a process in which the value resulting from converting the steering angle θh into the turning angle is adopted as the control amount and the target angle is adopted as the target value of the control amount may be executed.

Gradual Change Process

For example, in the case where the play compensation amount Δ does not reach the play compensation amount Δ0 at the time when the change in the target angle θt* is stopped, the play compensation amount Δ may be changed until the play compensation amount Δ reaches the play compensation amount Δ0. This means that the play compensation amount Δ is changed to the right play compensation amount αR in the case where the target angle θt* transitions from the state of the change in the right steering direction to the state of the stop of the change, for example.

In the process of S62, the gradual increase speed of the upper limit Δth is a constant value, but the applicable embodiment is not limited to this. For example, the change speed of the gradual increase speed of the upper limit Δth may be a previously determined change speed. Further, for example, the change speed of the gradual increase speed of the upper limit Δth may be altered depending on the change speed of the target angle θt*.

Play Compensation Amount

In the process of S38, the left play compensation amount αL does not need to be zero. For example, the absolute value of the left play compensation amount αL may be larger than zero, and may be smaller than the absolute value of the left play base amount αL0.

In the process of S40, the right play compensation amount αR does not need to be zero. For example, the absolute value of the right play compensation amount αR may be larger than zero, and may be smaller than the absolute value of the right play base amount ααR0.

The process exemplified in FIG. 4 is not essential for the setting of the right play compensation amount αR and the left play compensation amount αL. For example, the right play compensation amount αR and the left play compensation amount αL may constantly coincide with the right play base amount αR0 and the left play base amount αL0, respectively.

In the processes of S52 and S56, the determination about the steering direction is not essential. For example, instead of the target angle θt* in the process of S52, a value resulting from a filtering process of the target angle θt* may be used. Thereby, it is possible to restrain the determination of the reversal of the steering direction from being frequently made due to the influence of noise.

Automatic Steering Mode

In the above embodiment, the process in which the higher-level ECU 80 intervenes in the steering in the case where the vehicle is about to depart from the lane due to the operation of the steering wheel 12 by the driver is assumed. However, the automatic steering process that is executed in the automatic steering mode is not limited to such a process. For example, the automatic steering process that is executed in the automatic steering mode may be a process in which the higher-level ECU 80 intervenes in the steering in the case where the vehicle is about to make contact with an obstacle when the driver is operating the steering wheel 12.

Rudder Angle Control Process

The rudder angle control process does not need to include the process of calculating the operation amount for the feedback control in which the steering angle θh is adopted as the control amount and the target angle θt* is adopted as the target value of the control amount. For example, a process of calculating an operation amount for an open-loop control in which the steering angle θh is adopted as a control amount and the target angle θt* is adopted as the target value of the control amount may be included. Further, for example, a process of calculating both of the operation amount for the feedback control and the operation amount for the open-loop control may be included.

Steering Control Device

The steering control device is not limited to the device that acquires the target angle θt* set by the higher-level ECU 80. For example, a device in which the steering control device 60 and the higher-level ECU 80 are integrated may be adopted.

The steering control device 60 is not limited to the device that includes the PU 62 and the storage device 64 and that executes software processing. For example, at least some of the processes that are executed by software processing in the above embodiments may be executed by a dedicated hardware circuit (for example, an ASIC) that performs hardware processing. That is, the steering control device may have one configuration of the following (a) to (c). (a) A processing device that executes all of the above processes in accordance with programs and a program storage device that stores the programs, as exemplified by a ROM, are included. (b) A processing device that executes some of the above processes in accordance with programs, a program storage device, and a dedicated hardware circuit that executes the remaining processes are included. (c) A dedicated hardware circuit that executes all of the above processes is included. A plurality of software processing circuits each of which includes a processing device and a program storage device, or a plurality of dedicated hardware circuits may be provided. That is, the above process may be executed by a processing circuit that includes at least one of a single or a plurality of software processing circuits and a single or a plurality of dedicated hardware circuits.

What is claimed is:

1. A steering control device configured to control a steering device, the steering device including a steering wheel, a steering shaft coupled to the steering wheel, a turning wheel of a vehicle, the turning wheel being configured to turn along with rotation of the steering shaft, and a motor configured to rotate the steering shaft, the steering control device comprising:
   a processor configured to execute:
      an alarm information acquisition process of acquiring information indicating that an alarm needs to be issued to a driver of the vehicle, the information indicating that an alarm needs to be issued to the driver indicating that the vehicle is in a situation where steering for avoiding danger needs to be performed;
      a vibration process of vibrating the steering wheel in a predetermined region by operating the motor, in a situation where the alarm needs to be issued, the predetermined region being where a turning angle of the turning wheel does not change even when the steering wheel rotates;

a target rudder angle variable acquisition process of acquiring a value of a target rudder angle variable, the target rudder angle variable being a variable that indicates the turning angle of the turning wheel and that is set to a value for avoiding the danger in the situation where the steering for avoiding the danger needs to be performed;

a target rudder angle correction process of correcting the value of the target rudder angle variable by a play compensation amount corresponding to a steering direction of the steering device; and a rudder angle control process of operating the motor by a control in which a steering angle depending on a rotation angle of the steering shaft is adopted as a control amount and the value of the target rudder angle variable is adopted as a target value of the control amount, wherein the processor is further configured to start the vibration process after the value of the target rudder angle variable is corrected by the play compensation amount corresponding to the steering direction for avoiding the danger.

2. The steering control device according to claim 1, wherein the vibration process includes a process of displacing the steering wheel in an opposite direction of the steering direction of the steering device, at start of the vibration process.

3. The steering control device according to claim 1, wherein the vibration process includes a process of ending the vibration process by a process of displacing the steering wheel in the steering direction of the steering device.

4. The steering control device according to claim 1, wherein:

the processor is further configured to execute:

a play displacement calculation process of calculating a play displacement each time the steering angle changes, the steering angle being a rotation angle of the steering wheel, the play displacement being an amount that identifies a position in a region where the turning angle does not change even when the steering angle changes, the turning angle being a moving angle of the turning wheel;

a base amount setting process of setting a play base amount corresponding to a right steering direction and a play base amount corresponding to a left steering direction, to amounts that allow the steering angle to be values of end portions of the region, depending on the play displacement at a timing of setting of the play base amount; and a gradual change process of gradually changing a magnitude of the play compensation amount to a magnitude of the play base amount after the value of the target rudder angle variable changes in the right steering direction or the left steering direction, wherein the processor is configured to start the vibration process after the play compensation amount becomes the play base amount.

* * * * *